(12) United States Patent
Kasper et al.

(10) Patent No.: US 9,290,680 B2
(45) Date of Patent: *Mar. 22, 2016

(54) ADHESIVES MADE FROM POLYMER SYSTEMS

(71) Applicants: HENKEL AG & CO. KGAA, Duesseldorf (DE); HENKEL IP & HOLDING GMBH, Duesseldorf (DE)

(72) Inventors: Dirk Kasper, Duesseldorf (DE); Thomas Mueller, Duesseldorf (DE); Gunter Hoffmann, Bopfingen (DE); Knut Hoffmann, Bopfingen (DE); Andy Swain, Buchinghamshire (GB); Claudia Yaacoub, Bopfingen (DE); Maria Cristina Barbosa DeJesus, Basking Ridge, NJ (US)

(73) Assignees: HENKEL AG & CO. KGAA, Duesseldorf (DE); HENKEL IP & HOLDING GMBH, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/474,406

(22) Filed: Sep. 2, 2014

(65) Prior Publication Data

US 2014/0371379 A1 Dec. 18, 2014

Related U.S. Application Data

(63) Continuation of application No. 13/245,109, filed on Sep. 26, 2011, now Pat. No. 8,853,329, which is a continuation of application No. PCT/EP2010/054045, filed on Mar. 26, 2010.

(60) Provisional application No. 61/164,180, filed on Mar. 27, 2009.

(51) Int. Cl.
| | |
|---|---|
| *C09J 123/16* | (2006.01) |
| *C09J 123/08* | (2006.01) |
| *C09J 123/26* | (2006.01) |
| *C09J 119/00* | (2006.01) |
| *C08L 23/08* | (2006.01) |
| *C08L 23/16* | (2006.01) |

(52) U.S. Cl.
CPC .............. *C09J 119/00* (2013.01); *C08L 23/08* (2013.01); *C08L 23/0815* (2013.01); *C08L 23/16* (2013.01); *C09J 123/08* (2013.01); *C09J 123/16* (2013.01); *C08L 2205/02* (2013.01)

(58) Field of Classification Search
CPC ..... C08L 23/08; C08L 23/0815; C08L 23/16; C08L 23/00; C08L 2023/42; C08L 2205/02; C09J 119/00; C09J 123/00; C09J 123/26
See application file for complete search history.

(56) References Cited

U.S. PATENT DOCUMENTS

| | | | |
|---|---|---|---|
| 4,105,718 | A | 8/1978 | Weemes et al. |
| 5,612,144 | A | 3/1997 | Shinohara et al. |
| 5,618,883 | A | 4/1997 | Planthottam et al. |
| 5,798,175 | A | 8/1998 | Tynan, Jr. et al. |
| 6,143,818 | A | 11/2000 | Wang et al. |
| 8,853,329 | B2 * | 10/2014 | Kasper et al. ........... 525/240 |
| 2002/0019507 | A1 | 2/2002 | Karandinos et al. |

FOREIGN PATENT DOCUMENTS

| | | |
|---|---|---|
| EP | 0472946 A2 | 3/1992 |
| EP | 0477662 A2 | 4/1992 |
| EP | 0483675 A2 | 5/1992 |
| EP | 0489284 A2 | 6/1992 |
| EP | 0752447 A1 | 1/1997 |
| EP | 1273596 A1 | 1/2003 |
| EP | 1469035 A1 | 10/2004 |
| JP | S62265380 A | 11/1987 |
| JP | H05311138 A | 11/1993 |
| JP | H06057043 A | 3/1994 |
| JP | 2003506555 A | 2/2003 |
| JP | 2005539119 A | 12/2005 |
| RU | 2081887 C1 | 6/1997 |
| RU | 2170747 C2 | 7/2001 |
| SU | 468433 A3 | 4/1975 |
| WO | 0136502 A1 | 5/2001 |
| WO | 2005100501 A1 | 10/2005 |
| WO | 2007096276 A1 | 8/2007 |

OTHER PUBLICATIONS

Grigoryeva, O.P. et al. "Melt grafting of maleic anhydride onto an ethylene-propylene-diene terpolymer (EPDM)" Elsevier Science Ltd., European Polymer Journal, vol. 36 (2000) pp. 1419-1429.

* cited by examiner

*Primary Examiner* — Irina S Zemel
*Assistant Examiner* — Jeffrey Lenihan
(74) *Attorney, Agent, or Firm* — Sun Hee Lehmann

(57) ABSTRACT

The present invention relates to an adhesive, comprising at least one polymer system obtained by a process for reducing the melt viscosity of at least one polymer blend starting material, wherein the process comprises the step of treating at least one polymer blend with at least one radical donor under shear stress at a temperature above the softening point of said polymer blend.

15 Claims, No Drawings

ADHESIVES MADE FROM POLYMER SYSTEMS

CROSS-REFERENCE TO RELATED APPLICATIONS

This application is a continuation of U.S. application Ser. No. 13/245,109 filed Sep. 26, 2011, which is a continuation of International Application No. PCT/EP2010/054045 filed Mar. 26, 2010, which claims the benefit of U.S. Provisional Application No. 61/164,180 filed Mar. 27, 2009 and European Application No. 09163380.0 filed Jun. 22, 2009, the contents of all of which are incorporated herein by reference.

FIELD OF INVENTION

The present invention relates to an adhesive, comprising at least one polymer system obtained by a process for reducing the melt viscosity of at least one polymer blend starting material, wherein the process comprises the step of treating at least one polymer blend with at least one radical donor under shear stress at a temperature above the softening point of said polymer blend.

BACKGROUND OF THE INVENTION

Adhesives based on ethylene-propylene rubber copolymer (EPR) and/or an ethylene-propylene diene monomer rubber terpolymer (EPDM) are known in the art.

U.S. Pat. No. 5,798,175 discloses pressure sensitive adhesive (PSA) compositions based on a natural rubber or synthetic rubber and an amorphous polyolefin blend comprising EPR, hydrogenated polyisoprene and atactic polypropylene (APP). The adhesives are prepared by compounding the above-mentioned polymers, a compatible tackifier and an organic solvent. The adhesives are thus solvent based and not hot melts.

U.S. Pat. No. 5,612,144 discloses an adhesive tape composition comprising a polymer blend of at least one EPDM rubber, or preferably three different grades of EPDM rubbers in equal amounts, and another polymer selected from polyisoprene, polybutadiene, EPR, and mixtures thereof.

U.S. Pat. No. 5,618,883 discloses a hot melt pressure sensitive adhesive composition comprising a tackified EPR rubber modified with a copolymer of styrene-ethylene-butylene-styrene block copolymer and/or styrene-ethylene-propylene-styrene block copolymer.

These prior art compositions rely on curing or chemical crosslinking to acquire good cohesive strength and good adhesion characteristics.

U.S. Pat. No. 6,143,818 discloses a hot melt adhesive composition, comprising a polymer component consisting of EPR and/or EPDM rubber and at least one semi-crystalline olefinic polymer. The compositions provide an excellent heat stability, and good adhesion to a variety of substrates. Nevertheless the viscosity of the polymer component is too high for a number of applications, especially for those applications where a low viscosity of the adhesive or a high polymer proportion in the adhesive formulation is strongly required.

Notwithstanding the state of technology, it would be desirable to provide adhesives based on EPR and/or EPDM rubbers and semi-crystalline olefinic polymers, which exhibit a high cohesive strength, a narrow molecular weight distribution coupled with a low melt viscosity and a high flexibility.

SUMMARY OF THE INVENTION

The invention relates to an adhesive, comprising at least one polymer system, wherein the polymer system is obtained by a process for reducing the melt viscosity of at least one polymer blend starting material, wherein the process comprises the step of treating at least one polymer blend starting material with at least one radical donor under shear stress at a temperature above the softening point of said polymer blend starting material, which comprises:
  a) an elastomeric rubber or a blend of elastomeric rubbers selected from the group consisting of ethylene-propylene rubber and ethylene-propylene-diene monomer terpolymer rubber, and
  b) a semi-crystalline olefinic polymer or a blend of semi-crystalline olefinic polymers.

Desirably, the adhesive of the present invention comprises said polymer system in an amount from 15 to 95 percent by weight, based on the total amount of the adhesive.

DETAILED DESCRIPTION OF THE INVENTION

The present invention provides an adhesive, comprising at least one polymer system. The polymer system is obtained by a process for reducing the melt viscosity of at least one polymer blend starting material, wherein the process comprises the step of treating at least one polymer blend starting material with at least one radical donor under shear stress at a temperature above the softening point of said polymer blend starting material, which consists of:
  a) an elastomeric rubber or a blend of elastomeric rubbers selected from the group consisting of ethylene-propylene rubber and ethylene-propylene-diene monomer terpolymer rubber, and
  b) a semi-crystalline olefinic polymer or a blend of semi-crystalline olefinic polymers;

The polymer systems of the present invention can be obtained by a method comprising the following steps:
  a) providing at least one polymer blend starting material, which comprises or consisting of:
    an elastomeric rubber or a blend of elastomeric rubbers selected from the group consisting of ethylene-propylene rubber and ethylene-propylene-diene monomer terpolymer rubber, and a semi-crystalline olefinic polymer or a blend of semi-crystalline olefinic polymers;
  b) reducing the melt viscosity of the at least one polymer blend starting material by treating said polymer blend starting material with least one radical donor under shear stress above the softening point of the polymer blend starting material.

Preferably the polymer blend starting materials of the present invention are polymer alloys. The term "polymer alloy" as used herein has almost the same meaning as a "polymer-blend" but is narrower than a "polymer blend". In a polymer alloy the interactions between the constituting systems are stronger than in a polymer blend. The term "polymer alloy" is intended to mean a solid solution of a two systems in which the two systems are mutually finely dispersed to such a degree that they cannot be distinguished with the naked eyes.

The term polymer as used above includes homopolymers and copolymers such as terpolymers, tetrapolymers, etc.

The term "polymer system" as used in the present invention refers to a polymer or a mixture of two or more different polymers that are obtained by reducing the melt viscosity (200° C.) of at least one polymer blend starting material with at least one radical donor under shear stress at a temperature above the softening point of said polymer blend starting material. The polymer system of the present invention always exhibits a lower melt viscosity than the untreated polymer blend starting material. To compare the melt viscosities of the polymer system and the polymer blend starting material all melt viscosities are determined under the same conditions.

By the process for reducing the melt viscosity (200° C.) of the polymer blend starting materials as described above, modified materials with different properties can be obtained. Due to the controlled scission of the polymer chain, which occurs during the process described above, the polymer blend starting material is modified. This controlled scission, in effect, reduces the molecular weight of the polymer chains. As the average molecular weight is reduced, the melt viscosity is lowered and the molecular weight distribution is narrowed.

Preferably the melt viscosity, determined at 200° C., of the polymer blend starting material is reduced with at least one radical donor under shear stress until the melt viscosity (at 200° C.) of the obtained polymer system is less than 50% of the original melt viscosity (at 200° C.) of the polymer blend starting material.

The term "original melt viscosity" as used herein refers to the melt viscosity of the at least one polymer blend starting material before its melt viscosity (200° C.) is reduced by the process described above.

The process for reducing the melt viscosity (200° C.) of at least one polymer blend starting material with at least one radical donor under shear stress at a temperature above the softening point of said polymer blend starting material can be carried out in single screw extruders, twin screw extruders, Banbury mixers, kneaders and roll mills. Of these, it is particularly preferred to use single screw extruders, twin screw extruders, and kneaders.

According to one embodiment of the invention at least one polymer blend starting material, such as polymer blends in form of granules are optionally combined with one or more additives. The resulting composition is then fed into an extruder. At least one radical donor is combined with the resulting composition during extrusion by injecting it directly into the extruder, either at the feed throat or through an opening in the barrel, preferably as a solution. According to an alternate embodiment, at least one radical donor may be dry-blended with the composition, comprising at least one polymer blend starting material and optionally one or more additives before extrusion. Further, the additives, if present, may be added as a solution with the at least one radical donor, by injection into the molten resin during extrusion. Regardless of how the at least one radical donor or additional additives are added, at the elevated extrusion temperatures the radical donor initiates controlled degradation that decreases the average molecular weight of the polymer blend starting material. Vacuum degassing can be applied to the extruder barrel to remove any unreacted radical donor along with residual solvents. The degraded polymer blend starting material, which is a polymer system of the present invention, can leave the extruder through a die and is then quenched by a water bath and chopped into pellets. The molecular weight reduction obtained results in a very low melt viscosity, as measured by melt viscosity.

According to an alternative embodiment the polymer system of the present invention may be produced through a two stage process, which begins by performing a first stage extrusion process as described above, resulting in polymer pellets. These pellets may also be passed to a second stage process which is identical to the first stage except that the starting material is the polymer pellet produced from the first stage processing. As with the one stage process, the polymer may be dry mixed with at least one radical donor prior to extrusion.

The processes described above are usually performed at temperatures above the softening point of the at least one polymer blend starting material, preferably between 120° C. and 300° C., and more preferably between 150° C. and 250° C. In certain embodiments the processes described above are performed under a nitrogen atmosphere. The level of shear applied to the reaction mixture is not critical but it is preferably equivalent to the shear stress generated within a twin-screw, ZSK extruder such as is identified in the examples.

It will be apparent to those skilled in the art that the process for reducing the melt viscosity (200° C.) of at least one polymer blend starting material with at least one radical donor under shear stress at a temperature above the softening point of said polymer blend starting materials is not limited to a particular radical donor or class of radical donors. A number of radical donors, including azo compounds, diazo compounds and peroxides, such as organic peroxides, are useful with the present invention. The class of organic peroxides includes, but is not limited to: TRIGONOX 101® (2,5-dimethyl-2,5-di-[tert-butylperoxyl]hexane) and TRIGONOX 301® (3,6,9-triethyl-3,6,9-trimethyl-1,4,7-triperoxonane), both available from AKZO and (di-tert-amyl peroxide), available from CK Witco as DTAP® and from AKZO as Trigonox 201®, dicumyl peroxide, di-tert-butyl peroxide, 2,5-dimethyl-2,5-di(tert-butyl peroxy)hexyne-3, 1,3-bis(tert-butyl peroxyisopropyl)benzene, 1,1-bis(tert-butylperoxy)-3,3,5-trimethyl cyclohexane, n-butyl-4,4-bis(tert-butylperoxy)valerate, benzoyl peroxide, p-chlorobenzoyl peroxide, 2,4-dichlorobenzoyl peroxide, tert-butyl peroxy benzoate, tert-butyl peroxy isopropyl carbonate, diacetyl peroxide, lauroyl peroxide, tert-butyl cumyl peroxide, tert-butylperoxy-2-ethyl hexanoate.

The radical donors of the present invention are generally added to the polymer blend starting materials at temperatures between 10° and 200° C. and are used in their function as radical donors at temperatures between 100° C. and 300° C. The added amounts are between 0.05 and 10% by weight, but preferably between 0.2 and 2% by weight, based on the total amount of the polymer blend starting materials used in the process.

As mentioned above the melt viscosity (at 200° C.) of the polymer system of the present invention, which is produced according to the process described above, is less than 50%, more preferably less than 40%; or less than 30% and most preferably less than 20%; or less than 10% of the original melt viscosity (at 200° C.) of the starting polymer blend (polymer blend starting material).

In one embodiment the polymer blend starting material of the present invention has an original melt viscosity of at least 300,000 mPas at 200° C. In another embodiment the polymer blend starting material has an original melt viscosity at 200° C. of at least 350,000 mPas; or of at least 400,000 mPas, or of at least 450,000 mPas; or of at least 500,000 mPas; or of at least 1,000,000 mPas; or of at least 10,000,000 mPas; or of at least 20,000,000 mPas. Preferably the original melt viscosity (200° C.) of the polymer blend starting material is in the range of 300,000 mPas to 15,000,000 mPas.

In another embodiment the polymer system of the present invention has a melt viscosity (also referred to a Brookfield Viscosity) from 3,000 to 1,000,000 mPas at 200° C., preferably from 3,000 to 250,000 mPas. In one embodiment the polymer system described above has a melt viscosity at 200° C. from 4,000 to 200,000 mPas; or from 5,000 to 100,000 mPas; or from 6,000 to 80,000 mPas; or from 7,000 to 70,000 mPas; or from 8,000 to 60,000 mPas; or from 9,000 to 50,000 mPas. In other embodiments the melt viscosity at 200° C. of the polymer system described above is from 3,000 to 40,000 mPas; or from 3,500 to 30,000 mPas; or from 4,000 to 20,000 mPas, depending on the application.

The polymer system of the present invention can further be characterized by certain parameters like molecular weight distribution, glass transition temperature, heat of melting, and peak melting point (Tm). Due to its chemical nature, the polymer system preferably behaves as if it is a chemical identical polymer, even if two or more chemical different polymers are present in the polymer system. Therefore the parameters described above are referred to as the resulting molecular weight distribution, the resulting glass transition temperature, the resulting heat of melting, and the resulting peak melting point (Tm) of the polymer system.

In certain embodiments the polymer system of the present invention has a resulting molecular weight distribution Mw/Mn, as determined by gel permeation chromatography, from 1.5 to 5.0. In one embodiment the polymer system has a molecular weight distribution Mw/Mn from 1.6 to 4.0; or 1.7 to 3.3; or 2.0 to 3.0; or 2.2 to 2.8.

The polymer system of the present invention can be further characterized by its elongation at break. Preferably the polymer system described above has an elongation at break of at least 50% determined according to EN ISO 527-3. In one embodiment the polymer system has an elongation at break of at least 100%; or of at least 200%; or of at least 400%; or of at least 600%; or of at least 800%; or of at least 1000%; or of at least 1100%; or of at least 1200%; or of at least 1400%. In another embodiment the elongation at break of the polymer described above is between 50% and 2000%, preferably between 1000% and 1800%.

In another embodiment the polymer system of the present invention has a tensile strength at break of at least 2.5 MPa determined according to EN ISO 527-3. In certain embodiments the polymer system described above has a tensile strength at break of at least 5 MPa; or of at least 6 MPa; or of at least 8 MPa; or of at least 11 MPa. In another embodiment the tensile strength at break of the polymer system described above is between 2.5 MPa and 20 MPa, preferably between 10 MPa and 18 MPa.

In a further embodiment the polymer system of the present invention has a resulting glass transition temperature, as determined by DSC (Differential Scanning calorimetry), of between 5 and −65° C., preferably between −5 and −60° C. and more preferably between −10 and −50° C.

In certain embodiments the polymer system of the present has a resulting heat of melting from 30 to 90 J/g. In one embodiment the polymer system has a heat of melting from 30 to 80 J/g; or from 35 to 60 J/g; or from 40 to 50 J/g.

In another embodiment the polymer system of the present invention has a resulting peak melting point (Tm) comprised between 125° C. and 165° C. In another embodiment the polymer system has a peak melting point (Tm) between 130 and 160° C.; or between 131 and 150° C.; or between about 132 and 145° C.; or between 133 and 140° C.

As noted above, modified polymeric materials are obtained by the process for reducing the melt viscosity of polymer blend starting materials with at least one radical donor under shear stress. During the degradation process a controlled scission of the polymer chain occurs, which leads to the polymer systems of the present invention. The polymer systems and adhesives comprising the polymer systems exhibit a high flexibility and better adhesion than the untreated polymer blends or than adhesives, comprising the untreated polymer blend starting materials.

The term "elastomeric rubber" (EPR), as used herein, refers to elastomeric copolymers of ethylene and propylene, or such said copolymers modified with functional monomers.

In particular, the term "elastomeric rubber" reflects the property of the material that it can undergo a substantial elongation and then returned to its approximately original dimensions upon release of the stress elongating the material. Preferably elastomeric rubber of the present invention will have less than 50%, such as less than 30% or less than 10% permanent set after one minute when recovering from a strain of 100% applied for one minute at a temperature of 22° C.

The term "olefinic polymer", as used herein, refers to a polymer comprising one or more alpha-olefins in polymerized form.

In one embodiment the elastomeric rubber of the present invention comprises a copolymer of ethylene and propylene containing at least 40 percent by weight of ethylene, more preferably at least 50 percent by weight of ethylene, and most preferably at least 60 percent by weight of ethylene, such as at least 70 percent by weight of ethylene.

The use of polymer systems, comprising ethylene-propylene rubbers comprising at least 40 percent of ethylene is advantageous, because the resulting adhesives exhibit a high cohesive strength and toughness.

In an alternative embodiment the ethylene-propylene elastomeric rubber of the present invention comprises a copolymer of ethylene and propylene containing less than 35 percent by weight of ethylene, more preferably less than 32 percent by weight of ethylene, and most preferably less than 30 percent by weight of ethylene.

In particular, the ethylene-propylene rubber comprises from 10 to 35 percent by weight of ethylene, preferably from 15 to 32 percent by weight of ethylene, and particularly preferably from 20 to 30 percent by weight of ethylene, based on the total amount of the ethylene-propylene rubber.

The use of polymer systems, comprising ethylene-propylene rubbers comprising less than 35 percent of weight of ethylene is advantageous, because the resulting adhesives exhibit a high flexibility and a high elongation at break.

In a further embodiment the elastomeric rubber of the present invention comprises a copolymer of ethylene and propylene containing from 15 to 50 percent by weight of propylene.

In an alternative embodiment the ethylene-propylene rubber of the present invention comprises a copolymer of ethylene and propylene containing from 65 to 90 percent by weight, preferably from 70 to 80 percent by weight of propylene.

In certain embodiments the elastomeric rubber of the present invention comprises a copolymer of ethylene and propylene containing at least 40 percent by weight, such as at least 50 percent by weight of ethylene and from 15 to 50 percent by weight of propylene.

Alternatively, the ethylene-propylene rubber of the present invention can comprise from 10 to 35 percent by weight of ethylene and from 65 to 90 percent by weight of propylene.

Additionally the elastomeric rubber of the present invention can comprise a copolymer of ethylene and propylene modified with a functional monomer. The functional monomers include a class of unsaturated organic compounds containing one or more functional groups including carboxylic acid group, anhydride group, hydroxyl group, ether group, primary, secondary and tertiary amine groups and ester group.

The elastomeric rubbers of the present invention can also be selected from elastomeric terpolymers. Preferred elastomeric terpolymers (EPDM) comprise from 40 to 80 percent by weight of ethylene, from 15% to 50 percent by weight, preferably from 20 to 45 percent by weight of propylene, and from 2 to 15 percent by weight of a diene. The diene can be selected from the group consisting of 1,4-hexadiene, norbornadiene, ethylidene-norbornene, dicyclopentadiene, butadiene and isoprene.

The EPDM used here also includes functionally modified versions of terpolymers containing the functional groups herein mentioned above. EPR and EPDM rubbers are commercially available from Exxon Chemical Company under the Vistalon trade name and from DMS Polymers, Inc. under the Kelton trade name. Functionally modified EPDM containing anhydride groups are sold under the trade name Exxelor by Exxon Chemical Company.

The comonomer content of the elastomeric rubber (a) can be calculated from the measured (by FTIR) comonomer content of the semi-crystalline olefinic polymer (b) and the final polymer system taking account the weight ratios of elastomeric rubber (a) and semi-crystalline olefinic polymer (b).

In a preferred embodiment the semi-crystalline olefinic polymer is a copolymer of ethylene present at 1 to 35 wt.-% and at least one comonomer present at 65 to 99 wt.-% selected from the group consisting of C3-C20 alpha-olefins. Preferred C3-C20 alpha-olefins include C3-12 α-olefins such as propylene, butylene, hexene, octene, decene, dodecene, pentene, heptene, nonene, 4-methyl-pentene-1,3-methyl pentene-1, 3,5,5-trimethyl-hexene-1, and 5-ethyl-1-nonene. A particular preferred comonomer is propylene.

Preferred semi-crystalline olefinic copolymer used in the practice of this invention typically comprise units derived from propylene in an amount of at least 65 wt.-%, preferably at least about 80 wt.-% and more preferably at least 85, wt.-% of the copolymer. The typical amount of units derived from ethylene is at least 1 wt.-%, preferably at least 2 wt.-% and more preferably at least 5 wt.-%, and the maximum amount of units derived from ethylene present in these copolymers is not in excess of 35 wt.-%, preferably not in excess of 30 wt.-% and more preferably not in excess of 20 wt.-% of the copolymer. The amount of units derived from the C4-C20 alpha-olefins described above, if present, is typically at least 1 wt.-%, preferably at least 2 wt.-% and more preferably at least about 5 wt %, and the typical maximum amount of units derived from C4-C20 alpha-olefins described above, typically does not exceed 35 wt.-%, preferably it does not exceed 30 wt.-% and more preferably it does not exceed 20 wt % of the copolymer. The combined total of units derived from ethylene and any C4-C20 alpha-olefin typically does not exceed 40 wt.-%, preferably it does not exceed 30 wt.-% and more preferably it does not exceed about 20, wt % of the copolymer.

The term "semi-crystalline" used for the olefinic polymer refers to those polymeric materials that contain both crystalline and amorphous regions in the solid state. In the crystalline region, the molecular chains of the polymers are all arranged in ordered three-dimensional arrays whose structure can be fully characterized by their unit cells, the smallest structural unit used to describe a crystal. The amorphous polymers, in contrast, do not have ordered three-dimensional structures in the solid state. Their molecular chains are arranged in a completely random fashion in space. Semi-crystalline polymers can be easily distinguished from completely amorphous polymers by observing the presence or absence of a melting point (Tm) and the associated enthalpy or heat of melting ($\Delta H_m$) derived from the transformation of the crystalline state to liquid state upon heating. All semi-crystalline polymers exhibit a melting point, whereas the melting point is absent for amorphous polymers. Amorphous polymers undergo a transition from a glassy solid to a rubbery elastic state in a narrow temperature range around a glass transition temperature Tg. One should not confuse the glass transition temperature Tg with the melting point Tm. Unlike the melting transition of the crystalline materials, the glass transition of amorphous polymers do not have an enthalpy change ($\Delta H$) associated with it.

It should be pointed out that semi-crystalline polymers defined above are often referred to as crystalline polymers in the trade. Except for the single crystals prepared in the laboratories on a small scale, perfect crystalline polymers are not encountered in the commercial world and all so-called crystalline polymers, strictly speaking, are semi-crystalline. The definition of semi-crystalline polymers set forth herein, therefore, embraces the term "crystalline polymers".

Since semi-crystalline polymers contain both crystalline and amorphous regions, in addition to melting transition of crystals, they can exhibit a glass transition associated with the amorphous region of the material. The glass transition takes place at a temperature below the melting point.

The melting point Tm, the enthalpy or heat of melting ($\Delta H_m$) and the glass transition temperature (Tg) can be determined by Differential Scanning calorimetry (DSC). The technique is well known to those skilled in the art and is well described in scientific literature.

The term "semi-crystalline olefinic polymer" as used in the present invention particularly preferably refers to olefinic polymers having a heat of melting, as determined by DSC, from 20 to 95 J/g, more preferably from 25 to 90 J/g, and most preferably from 30 to 80 J/g.

The semi-crystalline olefinic polymers of the type described above can be purchased from numerous commercial sources, such as polypropylene-based semi-crystalline olefinic polymers from Huntsman Corporation under the trade name Rexflex.

Preferably the at least one polymer blend of the present invention consists of about 5 to 95 percent by weight of an elastomeric rubber or a blend of elastomeric rubbers selected from the group consisting of ethylene-propylene rubber and ethylene-propylene-diene monomer terpolymer rubber, and about 5 to 95 percent by weight of a semi-crystalline olefinic polymer or a blend of semi-crystalline olefinic polymers;

Preferred polymer blends used in the practice of the present invention have an EPR and/or EPDM rubber content from 5 to 80 percent by weight, preferably from 15 to 75 percent by weight, and more preferably from 30 to 60 percent by weight. Alternatively, polymer blends can be used having an EPR and/or EPDM rubber content from 50 to 80 percent by weight, preferably from 60 to 75 percent by weight, and more preferably from 65 to 70 percent by weight.

The at least one polymer blend most preferably contains 15 to 70 percent by weight of EPR, or EPDM, or a mixture thereof and from 30 to 85 percent by weight of at least one semi-crystalline olefinic polymer. In a particular preferred embodiment the polymer system of the present invention contains 30 to 70 percent by weight of EPR, or EPDM, or a mixture thereof and from 30 to 70 percent by weight of at least one semi-crystalline olefinic polymer.

The rubber and the semi-crystalline polymer can be premixed to form a polymer blend or polymer alloy. The polymer blend can be prepared by mechanical mixing of EPR/EPDM rubber with a semi-crystalline olefinic polymer through an extruder or Banbury Mixer or the like.

It can also be made in situ by step-wise polymerization in a single or a series of parallel reactors. An example of such in situ reactor process is the Catalloy Process employed by LyondellBasell. This process utilizes multiple gas phase reactors in parallel that allow separate polymerization of different monomer feed stock in each reactor. Each reactor runs independently of the others so each reactor product can be quite dissimilar to what is produced in the other reactors. The product from each reactor can be mixed or blended, creating alloyed polymers directly from the polymerization process. The described multi-stage polymerization process is for example disclosed in the following published references: EP-A-0 472 946, EP-A-0 477 662, EP-A-0 483 675 and EP-A-0 489 284.

An example of polymer blends or alloys produced by the Catalloy Process are thermoplastic olefins (TPOs), which are blends or alloys of EPR and semi-crystalline polypropylenes. Blends or alloys produced by the Catalloy Process are commercially available from LyondellBasell under the trade name designation Adflex, Softell, and Hifax.

The polymer systems of the present invention can be used directly as an adhesive or can be blended with other components to form an adhesive.

In the inventive adhesive one or more tackifiers may be used with the polymer systems of this invention. As used herein, the term "tackifier" refers to one or more compounds that are useful to impart tack to the adhesive of the present invention. Examples of suitable tackifiers, include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters. In some embodiments the tackifier is hydrogenated.

In other embodiments the tackifier is non-polar. Non-polar meaning that the tackifier is substantially free of monomers having polar groups. Preferably the polar groups are not present, however if they are preferably they are not present at more that 5 wt.-%, preferably not more that 2 wt.-%, even more preferably no more than 0.5 wt.-%.) In some embodiments the tackifier has a softening point (Ring and Ball, as measured by ASTM E-28) of 80° C. to 150° C., preferably 100° C. to 130° C. In another embodiment the resins is liquid and has a R and B softening point of between 10 and 70° C.

Preferred hydrocarbon resins for use as tackifiers or modifiers include:

1. Resins such as C5/C6 terpene resins, styrene terpenes, alpha-methyl styrene terpene resins, C9 terpene resins, aromatic modified C5/C6, aromatic modified cyclic resins, aromatic modified dicyclopentadiene based resins or mixtures thereof. Typically these resins are obtained from the cationic polymerization of compositions containing one or more of the following monomers: C5 diolefins (such as 1-3 pentadiene, isoprene, etc); C5 olefins (such as 2-methylbutenes, cyclopentene, etc.); C6 olefins (such as hexene), C9 vinylaromatics (such as styrene, alpha methyl styrene, vinyltoluene, indene, methyl indene, etc.); cyclics (such as dicyclopentadiene, methyldicyclopentadiene, etc.); and or terpenes (such as limonene, carene, etc).

2. Resins obtained by the thermal polymerization of dicyclopentadiene, and/or the thermal polymerization of dimers or oligomers of cyclopentadiene and/or methylcyclopentadiene, optionally with vinylaromatics (such as styrene, alphamethyl styrene, vinyl toluene, indene, methyl indene).

The resins obtained after polymerization and separation of unreacted materials, can be hydrogenated if desired.

The tackifier, if present, is typically present at about 1 to about 80 wt.-%, based upon the total weight of the adhesive, more preferably 2 to 40 wt.-%, even more preferably 3 to 30 wt.-%.

In another embodiment one or more waxes are used with the polymer systems in the adhesives of the present invention. The waxes are preferably selected from polar waxes, non-polar waxes, Fischer-Tropsch waxes, oxidized Fischer-Tropsch waxes, hydroxystearamide waxes, functionalized waxes, polypropylene waxes, such as polypropylene homopolymers and/or polypropylene copolymers, like copolymers based on C3 and C2 alpha-olefins or based on C3 and C4-20 alpha olefins, oxidized polypropylene waxes, polyethylene waxes, oxidized polyethylene waxes, wax modifiers, and combinations thereof.

Examples of suitable waxes include, but are not limited to polar waxes, non-polar waxes, Fischer-Tropsch waxes, oxidized Fischer-Tropsch waxes, hydroxystearamide waxes, functionalized waxes, polypropylene waxes, such as polypropylene homopolymers and/or polypropylene copolymers, like copolymers based on C3 and C2 alpha-olefins, oxidized polypropylene waxes, polyethylene waxes, oxidized polyethylene waxes, wax modifiers, amorphous waxes, carnauba waxes, castor oil waxes, microcrystalline waxes, beeswax, carnauba wax, castor wax, spermaceti wax, vegetable wax, candelilla wax, japan wax, ouricury wax, douglas-fir bark wax, rice-bran wax, jojoba wax, bayberry wax, montan wax, peat wax, ozokerite wax, ceresin wax, petroleum wax, paraffin wax, polyethylene wax, chemically modified hydrocarbon wax, substituted amide wax, and combinations and derivatives thereof.

In some embodiments, however, wax may not be desired and is present at less than 5 wt.-%, preferably less than 3 wt.-%, more preferably less than 1 wt.-%, more preferably less than 0.5 wt.-%, based upon the weight of the adhesive. In other embodiments the wax, is typically present at about 1 to about 50 wt.-%, based upon the total weight of the adhesive, more preferably 2 to 40 wt.-%, even more preferably 3 to 30 wt.-%.

In another embodiment the adhesive of the present invention comprises at least one polymer system of the present invention and typical additives known in the art such as plasticizers, fillers, oils, stabilizers, antioxidants, pigments, dyestuffs, polymeric additives, defoamers, preservatives, thickeners, rheology modifiers, humectants, masterbatches, and water.

Preferred plasticizers include mineral oils, polybutenes, phthalates benzoates, adipinic esters and the like. Particularly preferred plasticizers include phthalates such as di-iso-undecyl phthalate (DIUP), di-iso-nonylphthalate (DINP), dioctylphthalates (DOP) and the like. Particularly preferred oils include aliphatic naphthenic oils.

Preferred fillers include titanium dioxide, calcium carbonate, barium sulfate, silica, silicon dioxide, carbon black, sand, glass beads, mineral aggregates, talc, clay, calcium sulfate, calcium metasilicate, aluminium silicates, china clay, kaolin, glimmer, Mg- and Al-oxides and hydroxides glass fibres, synthetic fibres.

Suitable oils include mineral oil, aliphatic oils, aromatic oils, olefin oligomers and low molecular weight polymers, as well as vegetable and animal oils and derivatives of such oils. The petroleum derived oils which may be employed are relatively high boiling materials containing only a minor proportion of aromatic hydrocarbons. In this regard, the aromatic hydrocarbons should preferably be less than 30% and more particularly less than 15% of the oil, as measured by the fraction of aromatic carbon atoms. More preferably, the oil may be essentially non-aromatic. The oligmers may be polypropylenes, polybutenes, hydrogenated polyisoprenes, hydrogenated polybutadiens, or the like having average molecular weight between about 350 and about 10,000. Suitable vegetable and animal oils include glycerol esters of the usual fatty acids and polymerization products thereof.

In some embodiments, however, oils may not be desired and is present at less than 5 wt.-%, preferably less than 3 wt.-%, more preferably less than 1 wt.-%, more preferably less than 0.5 wt.-%, based upon the weight of the adhesive. In other embodiments the oil, is typically present at about 1 to about 30 wt.-%, based upon the total weight of the adhesive, more preferably 10 to 28 wt.-%, even more preferably 18 to 25 wt.-%.

Preferred antioxidants include thioesters, phosphates, hindered phenols, tetrakis(methylene 3-(3',5'-di-t-butyl-4 hydroxyphenyl)pro-pionate)methane, 2,2'-ethylidenebis(4,6-di-tertiarybutylphenol), 1,1-3-tris(2-methyl-4-hydroxy-5-t-butylephenyl) butane, 1,3,5-trimethyl2,4,6,tris(3,5-tertbutyl-4-hydroxybenzyl)benzene, dilaurylthiodipropionate, pentaerythritol tetrakis(beta-laurylthiopropionate), alkyl-aryldi- and polyphosphates, thiophosphites, and combinations or derivatives thereof.

Other preferred additives include block, antiblock, processing aids, UV stabilizers, neutralizers, lubricants, surfactants and/or nucleating agents, adhesion promoters may also be present.

Preferred additives include silicon dioxide, titanium dioxide, polydimethylsiloxane, talc, dyes, calcium sterate, carbon black, low molecular weight resins and glass beads. Preferred adhesion promoters include polar acids, polyaminoamides (such as Versamid 115, 125, 140, available from Henkel), urethanes (such as isocyanate/hydroxy terminated polyester systems, e.g. bonding agent TN/Mondur Cb-75 (Miles, Inc.), coupling agents, (such as silane esters (Z-6020 from Dow Corning)), titanate esters (such as Kr-44 available from Kenrich), reactive acrylate monomers (such as sarbox SB-600 from Sartomer), metal acid salts (such as Saret 633 from Sartomer), polyphenylene oxide, oxidized polyolefins, acid modified polyolefins, and anhydride modified polyolefins.

Additionally the adhesive of the present invention can comprise one or more polymeric additives selected from homo poly-alpha-olefins, copolymers of alpha-olefins, copolymers and terpolymers of diolefins, elastomers, polyesters, block copolymers, ester polymers, acrylate polymers, alkyl acrylate polymers and vinyl acetate polymers.

In one embodiment the inventive adhesive comprises from 15 to 95 percent by weight at least one polymer system of the present invention. Preferably the adhesive comprises at least one polymer system in an amount from 20 to 80 percent by weight. Depending on the application profile the adhesive of the present invention can comprise at least one polymer system in an amount from 30 to 50 percent by weight; or in an amount from 15 to 30 percent by weight; or in an amount from 25 to 65 percent by weight.

One typical formulation of the inventive adhesive comprises
- a) from 20 to 80 percent by weight of at least one polymer system of the present invention;
- b) from 5 to 80 percent by weight of at least one tackifier;
- c) from 0 to 50 percent by weight of at least one wax; and
- d) from 0 to 30 percent by weight of at least one additive.

Another typical formulation of the inventive adhesive comprises,
- a) from 20 to 80 percent by weight of at least one polymer system of the present invention;
- b) from 5 to 80 percent by weight of at least one tackifier;
- c) from 0 to 50 percent by weight of at least one wax; and
- d) from 0 to 30 percent by weight of at least one additive wherein the sum of the components c) and d) comprises from 0.1 to 50 percent by weight, preferably from 1 to 30 percent by weight and more preferably from 5 to 15 percent of weight of said adhesive.

Due to the special properties of the at least one polymer system of the present invention adhesives can be formulated, which exhibit a low viscosity coupled with a relatively high polymer content.

In one embodiment the adhesive comprises at least 30, preferably at least 40, and more preferably at least 50 percent by weight of at least one polymer system of the present invention, wherein the adhesive has a viscosity from 100 to 500,000 mPas, determined at the application temperature of said adhesive.

The viscosity in mPas can be measured with a Brookfield Thermosell RVT viscosimeter (available from Brookfield Engineering Laboratories, Inc., Stoughton, Mass. USA) at the application temperatures given. For viscosities up to 100.000 mPas spindle 27 was used; higher viscosities were measured with spindle 29.

The term "application temperature" refers to a temperature at which the adhesive is applied to one or more substrates. Preferably the application temperature of the adhesive is between 90° C. and 200° C.

Depending on the application profile, the adhesive of the present invention, comprising at least 30 percent by weight of at least one polymer system of the present invention has a viscosity from 100 to 500,000 mPas, preferably from 100 to 100,000 mPas.

Preferred adhesives of the present invention are selected from adhesives having an application temperature from 90 to 130° C. and a viscosity from 150 to 5,000 mPas; or an application temperature from 100 to 200° C. and a viscosity from 500 to 10,000 mPas; or from 130 to 200° C. and a viscosity from 10,000 to 500,000 mPas.

The adhesives of this invention can be used in any adhesive application, including but not limited to, disposables, packaging, laminates, hot melt adhesives, pressure sensitive adhesives, tapes, labels, wood binding, paper binding, nonwovens, road marking, reflective coatings, and the like.

The application of the said adhesives can be done by any adhesive application procedure, including but not limited to application with rollers, nozzles, spraying units and the like.

In a preferred embodiment the adhesives of this invention can be used for disposable diaper and napkin chassis construction, elastic attachment in disposable goods converting, packaging, labeling, bookbinding, woodworking, and other assembly applications. Particularly preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging. Additionally, the adhesive of this invention can be used as coatings for the backs of carpets, artificial turfs, or the like. Therefore the invention also relates to a method for providing the back of a carpet, artificial turf, or the like with a coating, wherein said adhesive is applied as a coating to the back of carpets, artificial turfs, or the like.

The adhesives described above may be applied to any substrate. Preferred substrates include wood, such as such as particle board, wood-plastic-composites, veneer paper, paper based materials such as melamine impregnated papers, cardboard, plastic, thermoplastic, rubber, metal, metal foil (such as aluminum foil and tin foil), metallized surfaces, cloth, nonwovens (particularly polypropylene spun bonded fibers or nonwovens), spunbonded fibers, cardboard, stone, plaster, glass (including silicon oxide (SiO x) coatings applied by evaporating silicon oxide onto a film surface), foam, rock, ceramics, films, polymer foams (such as polyurethane foam), substrates coated with inks, dyes, pigments, PVDC and the like or combinations thereof.

Additional preferred substrates include polyethylene, polypropylene, polyacrylates, acrylics, polyethylene terephthalate, or any of the polymers listed above as suitable for blends and their composites with fillers, glass fibres and the like.

Preferred substrates can also be selected from the group of biodegradable films, such as biodegradable films comprising natural or synthetic materials.

Any of the above substrates, and/or the polymers of this invention, may be corona discharge treated, flame treated, electron beam irradiated, gamma irradiated, microwaved, plasma treated, or silanized.

Additionally, the above substrates can be partially or fully coated with at least one adhesion promoter.

Another object of the present invention is a packaging adhesive comprising the adhesive of the present invention. Preferably the adhesive of the present invention is a packaging adhesive or can be used as a packaging adhesive.

One typical formulation of an adhesive for packaging and/or labeling comprises
  a) from 15 to 80 percent by weight of at least one polymer system of the present invention;
  b) from 10 to 70 percent by weight of at least one tackifier;
  c) from 0 to 40 percent by weight of at least one wax; and
  d) from 0 to 30 percent by weight of at least one additive.

Another typical formulation of an adhesive for packaging and/or labeling comprises,
  a) from 30 to 50 percent by weight of at least one polymer system of the present invention;
  b) from 20 to 45 percent by weight of at least one tackifier;
  c) from 5 to 30 percent by weight of at least one wax; and
  d) from 0 to 30 percent by weight of at least one additive.

A further object of the present invention is a package, comprising the packaging adhesive described above, wherein the packaging adhesive is applied to at least a portion of one or more packaging elements selected from the group consisting of paper, paperboard, containerboard, tagboard, corrugated board, chipboard, kraft, cardboard, fiberboard, plastic resin, metal, metal alloys, foil, film, plastic film, laminates, cartons, containers, crates, cases, corrugated cases, trays, cereal products, cracker products, beer packaging, frozen food products, paper bags, drinking cups, milk cartons, juice cartons, drinking cups, and containers for shipping produce.

Another object of the present invention is a disposable article comprising the inventive adhesive, wherein said adhesive is applied to at least a portion of one or more disposable elements selected from the group consisting of nonwoven fabrics, nonwoven webs, non-elastic nonwoven fabrics, elastic nonwoven fabrics, necked-bonded laminates, stretch-bonded laminates, spunbond-meltblown-spunbond laminates, polypropylene spunbonded layers, polyethylene layers, combination polyethylene and polypropylene spunbonded layers, elastic strands, styrene-isoprene-styrene, styrene-butadiene-styrene, styrene-ethylene/propylene-styrene, styrene-co-butadiene-styrene, polyurethane, woven fabrics, polypropylene, polyester, body fluid impermeable backsheets, body fluid impermeable layers, body fluid permeable layers, body fluid permeable covers, absorbents, tissues, elastomeric materials, superabsorbent polymers, polyolefin films, polyester films, polyvinylchloride films, polyvinylidine chloride films, polyvinyl acetate films, elastic attachment tape, frontal tape backing, wood, paper, barrier films, film laminates, nonwoven composites, textile materials, woven materials, durable fabrics, absorbents, elastomeric strands, elastomeric webs, tissues, films, coverstock materials, nonwoven polyethylene, perforated polyethylene, superabsorbent polymers, filaments, porous webs, fibers, loop fastener material, spunbonded nonwoven articles, liners, elastic side panels, fastening tape, elastic bands, rayon, nylon, cellulosic pulp, cellulosic fluff, superabsorbent batts, diapers, training pants, sanitary napkins, panty liners, incontinent wear, bed pads, surgical gowns, surgical drapes, rodent traps, hook and loop fasteners, garments, medical garments, and swimwear.

One typical formulation of an adhesive for disposable elements comprises
  a) from 15 to 80 percent by weight of at least one polymer system of the present invention;
  b) from 10 to 70 percent by weight of at least one tackifier;
  c) from 0 to 5 percent by weight of at least one wax; and
  d) from 0 to 30 percent by weight of at least one additive.

Another typical formulation of an adhesive for disposable elements comprises,
  a) from 20 to 60 percent by weight of at least one polymer system of the present invention;
  b) from 30 to 65 percent by weight of at least one tackifier;
  c) from 0 to 5 percent by weight of at least one wax; and
  d) from 0 to 25 percent by weight of at least one additive.

An additional object of the present invention is a film comprising the inventive adhesive. In one embodiment the film further comprises one more additional polymer components selected from the group consisting of polyethylene, polypropylene, polyester, polyethylene terephthalate, polyvinyl chloride, polyvinylidine chloride, polyvinyl acetate, polyamides, homo polymers thereof, and copolymers thereof.

An additional object of the present invention is pressure sensitive adhesive comprising the adhesive described herein. Preferably the adhesive of the present invention is a pressure sensitive adhesive or can be used as a pressure sensitive adhesive.

As used herein, "pressure sensitive adhesives" are adhesive compositions that have the ability at, or at about, room temperature (about 25° C.) to sufficiently wet a substrate under gentle pressure and to form a useful bond. As used here, the term "useful bond" differs depending on the substrate application and refers to a corresponding balance of adhesive and cohesive strength.

Another object of the invention is a spine glue or side glue comprising the adhesive of the present invention.

A further object of the present invention is a laminate article comprising two or more layers in combination with the inventive adhesive which is present between the layers.

Laminate articles consist of layers, or laminae, bonded together by suitable binders. Laminaes are usually materials that are readily available in continuous-sheet forms, such as paper or woven fabrics. The binders are synthetic resins, predominantly phenolic resins, that are solvent-coated or impregnated into the base laminae. After drying, several laminae are stacked and the entire mass is consolidated under heat and pressure to form a rigid sheet or panel used for its mechanical, electrical, chemical, or aesthetic qualities. In industry, laminaes are used for their electrical properties, impact strength, wearing quality, or chemical resistance.

They are used in electronic applications, electrical switches, gears, etc. Although extremely important functionally, they are seldom conspicuous.

Laminate articles can consist of a reinforcing fibrous web extending through a matrix of synthetic resinous material. The choice of web and resin determines the properties of the laminate article and, to a great extent, the process used for manufacture. The term "laminate article" as used herein includes any multiple-layered article that is subjected to heat and/or pressure to form a multiple layer structure. A laminate layer is a sheetlike material that may be treated with resin, such as tackifiers as described below, and consolidated by heat and pressure. Typical layers include papers, woven fabrics, mats, felts, and similar materials. The layers are usually in the form of a continuous roll, although wood veneers are a notable exception. Laminating layers are classified by the form (paper, woven fabric, etc) or the constituent, which may vary from absorbent organic cellulose to non-absorbent inorganic glass. Each layer can individually be a film layer, a coating layer, a fibrous layer, a foam layer, a substrate layer, and/or other suitable layers. Each layer of the laminate may be formed of the same or different materials, such as wood, plastic, paper, rubber, thermoplastic, cardboard, metal, including metal alloys, compounded materials, metal foil, such as aluminum and tin foil, metallized surfaces, and dynamically vulcanized alloys, cloth, spunbonded fibers, stone, plaster, glass, including silicon oxide (SiO x) coatings applied by evaporating silicon oxide onto a film surface, rock, ceramics, films, foams, nonwovens, including particularly polypropylene spun bonded fibers, and substrates coated with inks, dyes, pigments, PVDC and the like and any combinations, blends, and mixtures thereof. Furthermore, each layer can vary in thickness depending on the intended uses.

In one aspect, the layers may include one or more of the following, alone or in combination with the adhesive described herein.

Another object of the present invention is a hot melt adhesive comprising the adhesive of the present invention. Preferably the adhesive of the present invention is a hot melt adhesive or can be used as a hot melt adhesive.

Hot melt adhesives exist as a solid at ambient temperature and can be converted into a tacky liquid by the application of heat. Hot melt adhesives are typically applied to a substrate in molten form.

In one aspect, the hot melt adhesive has a set temperature of from −20° C. to 250° C. and an open temperature of from −20° C. to 250° C. Additionally, in another aspect, the hot melt adhesive has a cloud point of 275° C. or less, or 120° C. or less. More preferably, the hot melt adhesive has a cloud point of 100° C. or less.

The hot melt adhesive described herein can be prepared using conventional methods well known in the art. For example, the at least one polymer system, tackifier, and desired optional ingredients such as plasticizer oil, wax, liquid resin tackifiers, etc., can be blended under low or high shear mixing at elevated temperatures to form a fluid melt. Mixing temperatures depend upon the particular adhesive formulation, and are generally in the range of about 130° C. to about 200° C., with about 150° C. to about 160° C. being a typical suitable range.

A further object is an article of the woodworking industry, for example furniture, doors, windows, window sills, panels flooring, profiles and other furniture parts comprising the adhesive of the present invention.

In a particular embodiment, the adhesives of this invention can be used in woodworking. For purposes of convenience, the word "woodworking" will be used to describe the process by which articles of the woodworking industry, for example furniture, doors, windows, window sills, panels, flooring, profiles and other furniture parts are made by joining substrates with an adhesive which is applied to at least one of the substrates. Typical processes which are used are edge banding, profile wrapping and assembly.

One typical formulation of an adhesive for woodworking comprises
  a) from 20 to 80 percent by weight of at least one polymer system of the present invention;
  b) from 10 to 50 percent by weight of at least one tackifier;
  c) from 0 to 20 percent by weight of at least one wax; and
  d) from 0 to 50 percent by weight of at least one additive.

Another typical formulation of an adhesive for woodworking comprises,
  a) from 50 to 70 percent by weight of at least one polymer system of the present invention;
  b) from 20 to 40 percent by weight of at least one tackifier;
  c) from 0 to 15 percent by weight of at least one wax; and
  d) from 0 to 30 percent by weight of at least one additive.

A further object of the present invention is a bookbinding article, comprising the adhesive of the present invention and a binder element, wherein the adhesive is applied to at least a portion of the binder element.

In a particular embodiment, the adhesives of this invention can be used in bookbinding. For purposes of convenience, the word "bookbinding" will be used to describe the process by which books having a binder element, wherein an adhesive is applied to at least a portion of the binder element, are produced. However, the embodiments described herein are not limited to adhesive compositions suitable for binding only books. As used herein the term "books" is intended to include other articles containing pages bound with adhesive compositions such as paperback books, soft cover books, instruction manuals, magazines, catalogs, trade journals, directories, and the like.

One typical formulation of an adhesive for bookbinding comprises
  a) from 20 to 80 percent by weight of at least one polymer system of the present invention;
  b) from 10 to 70 percent by weight of at least one tackifier;
  c) from 0 to 20 percent by weight of at least one wax; and
  d) from 0 to 30 percent by weight of at least one additive.

Another typical formulation of an adhesive for bookbinding comprises,
  a) from 20 to 40 percent by weight of at least one polymer system of the present invention;
  b) from 30 to 65 percent by weight of at least one tackifier;
  c) from 5 to 15 percent by weight of at least one wax; and
  d) from 5 to 30 percent by weight of at least one additive.

Another object of the present is a sealant composition comprising the adhesive of the present invention. Preferably the adhesive of the present invention is a sealant composition or can be used as a sealant.

The purpose of a sealant is to maintain a seal between two surfaces of a single substrate, thus repairing the substrate, or in the alternative, to establish and maintain a seal between a pair of substrates. The substrates can include concrete, roofing, marble, anodized aluminum, brick, mortar, granite, limestone, porcelain, glass, painted surfaces, wood, polyvinylchloride, polyacrylate, polycarbonate, polystyrene, fabrics, gaskets, particle board, plastic, stone, masonry materials, pipes, hoses, metal, wiring, skis, polyethylene, polypropylene, polyester, acrylic, PVDC, paper, ethylene vinyl acetate, automobiles, buildings, aircraft, panels, decks, bones, pavement, tailgates, door panels, wheel houses, rocker panels, firewalls, floor hem flanges, trunks, and floorpans. For example, sealant compositions may be used for repairing leaky pipes or cracked windshields on automobiles. Sealants further produce load bearing elastic joints between two or more surfaces and to prevent the passage of air, water and dirt there through.

Sealant compositions are useful not only in filling gaps and thus bonding the surfaces of a substrate in a repair operation, but also may be used to bond a first substrate to another substrate. The automotive industry, in particular, is a major user of sealants for this purpose. Automobiles are assembled from several structural components that are joined together in various fashions depending on the particular components and the degree of stress that will have to be endured by the components. For example, sealants are utilized in the assemblies of door panels, quarter panels, tailgates and roofs. Still other automobile assemblies that are welded or bolted together use sealant compositions in their seams. The wheel house, shock lower, rocker panel, firewall, floor hem flange, floorplan, and trunk are further examples of automotive applications which employ sealants.

CHARACTERIZATION AND TESTS

If not otherwise noted, the following methods are used to characterize the polymers of the present invention:

Viscosity

The viscosity in mPas was measured with a Brookfield Thermosell RVT viscosimeter (available from Brookfield Engineering Laboratories, Inc., Stoughton, Mass. USA) at the temperatures of 200 degree C. For viscosities up to 100.000 mPas spindle 27 was used; higher viscosities were measured with spindle 29.

Differential Scanning Calorimetry (DSC)

The DSC measurements were conducted using a TA Instruments Q2000 MDSC under the following conditions: a small sample of around 6-10 mg of the polymer was sealed in an aluminum sample pan, loaded into the instrument at room temperature and was cooled down to −90° C. After equilibration at this temperature for 20 minutes the sample was heated to 200° C. at a heating rate of 10° C./minute (first heating cycle). The sample was then held for 10 minutes at this temperature to destroy its thermal history. Then the sample was cooled to −90° C. at a cooling rate of 5° C./min. This cooling phase is referred to hereinafter as the return phase. The sample was kept at −90° C. for 10 minutes and subsequently heated to 250° C. at 10° C./min. in a second heating phase (second heating cycle). All thermal effects which occurred during the three phases (e.g. glass transition, peak melting point (Tm), heat of melting (ΔHm) were subsequently evaluated by software from the experimental data files. The melting temperatures are the peak melting points from the second heat unless otherwise indicated. For polymers displaying multiple peaks, the higher melting peak temperature was reported. Areas under the curve were used to determine the heat of melting (ΔHm). The peak integration results were normalized for sample weight and reported in J/g.

GPC Method

The gel permeation chromatographic system consisted of a Polymer Laboratories Model PL-220 instrument with a Refractive Index Detector. The column and carousel compartments were operated at 150° C. Three linear columns (Polymer Laboratories, Typ "Olexis"; 300×8 mm) were used. The solvent was 1,2,4 trichlorobenzene. The samples were prepared at a concentration of 1.0 mg/ml containing 200 ppm of butylated hydroxytoluene (BHT). The flow rate was 1.0 ml/minute. Calibration of the GPC column set was performed with narrow molecular weight distributed polystyrene standards.

Determination of Tensile Properties

The tensile properties were measured according EN ISO 527-3-3 with a Zwick tensile tester (model ZMART.PRO). All samples were measured with a velocity of 10 mm/min. The test specimens were conditioned at 23° C. and 50 percent relative humidity 24 hours prior to testing.

Softening Point

The softening point is determined according to ASTM E-28 using the Ring and Ball method.

The present invention will be more fully appreciated when viewed together with the following non-limiting examples.

EXAMPLES

The following materials were used:

Polymer Blend Starting Materials

Adflex T100F: polypropylene copolymer with high content of ERR rubber from LyondellBasell.

Softel CA02: polypropylene copolymer with hight content of EPR rubber from LyondellBasell. This polymer blend starting material has a viscosity at 200° C. of 68000 Pas, an elongation at break according to EN ISO 527-3 of >500% and a tensile strength at break according to EN ISO 527-3 of 10 MPa.

Non-Elastomeric Rubber Containing Starting Materials (NERSM):

NERSM 1: polypropylene/ethylene random copolymer. This polymer has a viscosity at 200° C. of 1600 Pas, an elongation at break according to EN ISO 527-3 of 500% and a tensile strength at break according to EN ISO 527-3 of 25 MPa.

NERSM 2: polyproplyene/ethylene/butene random terpolymer. This polymer has a viscosity at 200° C. of 5000 Pas, an elongation at break according to EN ISO 527-3 of >500% and a tensile strength at break according to EN ISO 527-3 of 35 MPa.

Irganox 1010: Antioxidant, Ciba

Regalite S1100: hydrogenated styrene/methyl styrene/indene copolymer from Eastman Trigonox 145-E85: 2,5-dimethyl-2,5-di(tert-butylperoxy) hexyne-3 from AkzoNobel

Example 1

The polymer system 1 was obtained by the following process:

To the polymer blend starting material Adflex T100F, which has a melt viscosity (200° C.) of 13500 Pas, 1.2 percent by weight of Trigonox 145-E85 was added, based on the total amount of Adflex T100F. By treating the resulting mixture in a 25 mm twin-screw extruder (ZSK 25/40D; Werner&Pfleiderer) at 220° C. a polymer system of the present invention was obtained which exhibits a melt viscosity (200° C.) of 25 Pas.

The corresponding data of the polymer blend starting material Adflex T100F and the obtained polymer system is given in Table 1. It can be seen that the elongation at break is increased and the viscosity, the mol weight (Mw) and the mol weight distribution (MWD) is significantly reduced by the polymer degradation step.

TABLE 1

Comparison of polymer data of polymer blend Adflex T100F and the obtained polymer system

| Polymer | Viscosity [Pas] Brookfield | Mw × 1000 | MWD (Mw/Mn) | Heat of Melting [J/g] DSC | Tg [° C.] | Melting Temp [° C.] | Tensile Strength at Break [N/MM$^2$] | Elongation at break [%] |
|---|---|---|---|---|---|---|---|---|
| Polymer blend starting material Adflex T100F | 13500 | 504 | 7.07 | 45.6 | −38 | 143.9 | 18.5 | 1300 |
| Polymer system 1 | 25 | 87 | 2.78 | 39.3 | −36 | 137.7 | 6.8 | 800 |

Example 2

The polymer system 2 was obtained by the following process:

To the polymer blend starting material Softel CA02, which has a melt viscosity (200° C.) of 68000 Pas, 2.0 percent by weight of Trigonox 145-E85 was added, based on the total amount of Softel CA02. By treating the resulting mixture in a 25 mm twin-screw extruder (ZSK 25/40D; Werner&Pfleiderer) at 220° C. a polymer system of the present invention was obtained which exhibits a melt viscosity (200° C.) of 107 Pas.

Example 3

The degraded non-elastomeric rubber containing polymer 1 (DNERP 1) was obtained by the following process:

To NERSM 1, which has a melt viscosity (200° C.) of 1600 Pas, 2.0 percent by weight of Trigonox 145-E85 was added, based on the total amount of NERSM 1. By treating the resulting mixture in a 25 mm twin-screw extruder (ZSK 25/40D; Werner&Pfleiderer) at 220° C. the degraded non-elastomeric rubber containing polymer DNERP 1 was obtained, which exhibits a melt viscosity (200° C.) of 9 Pas.

Example 4

The degraded non-elastomeric rubber containing polymer 2 (DNERP 2) was obtained by the following process:

To NERSM 2, which has a melt viscosity (200° C.) of 5000 Pas, 2.0 percent by weight of Trigonox 145-E85 was added, based on the total amount of NERSM 2. By treating the resulting mixture in a 25 mm twin-screw extruder (ZSK 25/40D; Werner&Pfleiderer) at 220° C. C the degraded non-elastomeric rubber containing polymer DNERP 2 was obtained, which exhibits a melt viscosity (200° C.) of 4.5 Pas.

With the polymer blend starting material Adflex T100F, the obtained polymer systems 1 and 2, and the degraded non-elastomeric rubber containing polymers 1 and 2, different base hot melt formulations were obtained by mixing the components. The different formulations are shown in Table 2.

TABLE 2

Base hot melt formulations

| | Formulation 1 (Ref.) | Formulation 2 | Formulation 3 | Formulation 4 (Ref.) | Formulation 5 (Ref.) |
|---|---|---|---|---|---|
| Polymer blend starting material Adflex T100F | 69.75 wt.-% | — | — | — | — |
| Polymer system 1 | — | 69.75 wt.-% | — | — | — |
| Polymer system 2 | — | — | 69.75 wt.-% | — | — |
| DNERP 1 | — | — | — | 69.75 wt.-% | — |
| DNERP 2 | — | — | — | — | 69.75 wt.-% |
| Regalite S1100 | 29.75 wt.-% | 29.75 wt.-% | 29.75 wt.-% | 29.75 wt.-% | 29.75 wt.-% |
| Irganox 1010 | 0.5 wt.-% | 0.5 wt.-% | 0.5 wt.-% | 0.5 wt.-% | 0.5 wt.-% |
| Viscosity @200° C. [mPas] | 5,600,000 | 10,500 | 72,500 | 7,700 | 4,870 |
| Adhesive evaluation | Not applicable | + | + | − | − |

Due to the very high viscosity of the formulation 1 the hot melt formulation was not applicable.

Adhesive Evaluation

The hot melt formulations were prepared at 200° C. At this temperature two strips of KRAFTLINER corrugated paperboard (5×5 cm) were bonded to one another by applying 0.9-1.1 gram of the hot melt formulations as shown in Table 2 with a spatula and were pressed by hand subsequently. After storing the specimen for at least one day at room temperature (23° C.) the specimen were pulled apart by hand. The degree of fiber breakage of the specimen was used to evaluate the adhesive properties of the formulations.

Evaluation of Adhesion:

Adhesive failure: 0-30% of remaining fibers on the adhesive spot: −

Partly fiber breakage: 30-60% of remaining fibers on the adhesive spot: −+

Fiber breakage: 60-90% of remaining fibers on the adhesive spot: +

Intensive fiber breakage: >90% of remaining fibers on the adhesive spot: ++

As depicted in Table 2, the hot-melt formulations comprising the polymer system of the present invention (formulation 2 and 3) have a high cohesive strength coupled with a low viscosity. Notably, the hot melt formulation 3 has a significant higher viscosity which does not negatively affect the good wetting and adhesion performance. The two comparative formulations 4 and 5 are too brittle which leads to adhesive failure.

The invention claimed is:

1. An adhesive made by the process of:
(A) degrading a polymer system with a radical donor until the degraded polymer system has a melt viscosity of less than 50% than the non-degraded polymer at 200° C.; and
(B) adding a tackifier;
  wherein the degraded polymer system of the resulting adhesive consists of (a) 30 to 70 wt % of an elastomeric rubber selected from the group consisting of ethylene-propylene rubber copolymer, ethylene-propylene-diene rubber terpolymer, and mixtures thereof and (b) 30 to 70 wt % a semi-crystalline olefinic polymer or a blend of semi-crystalline olefinic polymers;
  wherein the semi-crystalline olefinic polymer has a heat of melting from 20 to 95 J/g;
  wherein the degraded polymer system is present at a level greater than 30 wt %, based on the total weight of the adhesive; and
  wherein the molecular weight distribution Mw/Mn of the degraded polymer system ranges from 1.6 to 4.0.

2. The adhesive of according to claim 1, wherein the elastomeric rubber comprises less than 35% of ethylene.

3. The adhesive according to claim 1, wherein the degraded polymer system has an elongation at break of at least 50% determined according to EN ISO 527-3.

4. The adhesive according to claim 1, wherein the degraded polymer system has a tensile strength at break of at least 2.5 MPa determined according to EN ISO 527-3.

5. The adhesive according to claim 1, wherein the elastomeric rubber is ethylene-propylene rubber copolymer that contains at least 40 percent by weight of ethylene.

6. The adhesive according to claim 1, wherein the elastomeric rubber is ethylene-propylene rubber copolymer that contains 15 to 50 percent by weight of propylene.

7. The adhesive according to claim 1, wherein the elastomeric rubber is ethylene-propylene-diene rubber terpolymer that contains 40 to 80 percent by weight of ethylene, 15 to 50 percent by weight of propylene, and 2 to 15 percent by weight of a diene.

8. The adhesive according to claim 7, wherein the ethylene-propylene-diene rubber terpolymer contains 20 to 45 percent by weight of propylene.

9. The adhesive according to claim 8, wherein the diene is selected from the group consisting of 1,4-hexadiene, norbornadiene, ethylidene-norbornene, dicyclopentadiene, butadiene and isoprene.

10. The adhesive according to claim 1, wherein the semi-crystalline olefinic polymer is a copolymer of ethylene present at 1 to 35 wt % and at least one comonomer present at 65 to 99 wt % selected from the group consisting of C3-C20 alpha-olefins.

11. The adhesive according to claim 1, wherein the radical donor is selected from azo compounds, diazo compounds or peroxides.

12. The adhesive according to claim 1, wherein the adhesive comprises greater than 40 wt %, based on the total weight of the adhesive, of the degraded polymer system.

13. The adhesive according to claim 12, wherein the adhesive comprises greater than 50 wt %, based on the total weight of the adhesive, of the degraded polymer system.

14. An adhesive made by the process of:
(A) degrading a polymer system with a radical donor until the degraded polymer system has a melt viscosity of less than 50% than the non-degraded polymer at 200° C.; and
(B) adding a tackifier and a plasticizer;
  wherein the polymer system consists of (a) 30 to 70 wt % of an elastomeric rubber selected from the group consisting of ethylene-propylene rubber copolymer, ethylene-propylene-diene rubber terpolymer, and mixtures thereof and (b) 30 to 70 wt % a semi-crystalline olefinic polymer or a blend of semi-crystalline olefinic polymers;
  wherein the semi-crystalline olefinic polymer has a heat of melting from 20 to 95 J/g;
  wherein the degraded polymer is present at a level greater than 30 wt %, based on the total weight of the adhesive;
  wherein the plasticizer present at a level less than 5 wt %, based on the total weight of the adhesive; and
  wherein the molecular weight distribution Mw/Mn of the degraded polymer system ranges from 1.6 to 4.0.

15. An adhesive made by the process of:
(A) degrading a polymer system with an azo compound, a diazo compound or a peroxide until the degraded polymer system has a melt viscosity of less than 50% than the non-degraded polymer at 200° C.; and
(B) adding a tackifier and a plasticizer;
  wherein the degraded polymer system of the resulting consists of (a) 50 to 80 wt % of an elastomeric rubber selected from the group consisting of ethylene-propylene rubber copolymer, ethylene-propylene-diene rubber terpolymer, and mixtures thereof and (b) 20 to 50 wt % a semi-crystalline olefinic polymer or a blend of semi-crystalline olefinic polymers;
  wherein the semi-crystalline olefinic polymer has a heat of melting from 20 to 95 J/g;
  wherein the degraded polymer system is present at a level greater than 40 wt %, based on the total weight of the adhesive; and
  wherein the molecular weight distribution Mw/Mn of the degraded polymer system ranges from 1.0 to 4.0.

* * * * *